United States Patent Office 2,822,364
Patented Feb. 4, 1958

2,822,364
NOVEL ANIONIC GUANAMINE PHOSPHONATES AND METHODS FOR PREPARING SAME

Walter H. Schuller, Delray Beach, Fla., assignor to American Cyanamid Company, New York, N. Y., a corporation of Maine No Drawing. Application May 22, 1957
Serial No. 660,757

2 Claims. (Cl. 260—249.9)

This invention relates to novel anionic guanamine phosphonates and to methods for their preparation. More specifically, it relates to the alkali metal salt of an ethyl hydrogen 4,6-diamino-s-triazinylmethylphosphonic acid, represented by the following formula:

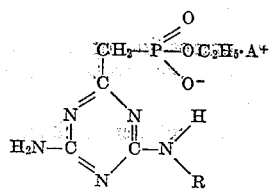

in which R is a hydrogen or phenyl radical and A+ is a cation such as sodium, potassium, lithium and the like.

The new class of compounds may be characterized as colorless solids which are soluble in polar solvents, such as methanol, ethanol and isopropanol. The compounds described in the following description are useful as antistatic agents for synthetic textiles or fabrics, for example the polyamides as nylon, the polyesters as Acrilan and the acrylics as Creslan.

According to the present invention, the class of compounds defined above may be prepared conveniently by reacting a 4,6-diamino-2-chloromethyl-s-triazine with at least two moles of triethyl phosphite. A diethyl 4,6-diamino-s-triazinylmethylphosphonate is formed. The latter is next hydrolyzed in the presence of a mineral acid to the corresponding monoethyl hydrogen 4,6-diamino-s-triazinylphosphonic acid. The acid may then be neutralized with sufficient alkali metal hydroxide to form the corresponding alkali metal salt of the hydrogenphosphonic acid.

For purposes of illustration, the following equations can be set forth to demonstrate the nature of the process of the present invention.

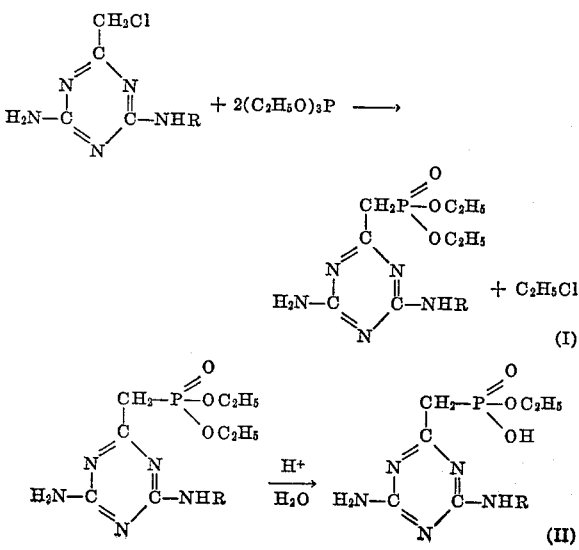

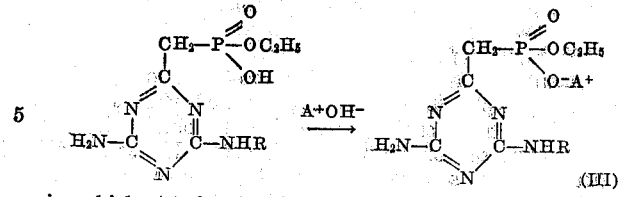

in which A+ is a cation, such as sodium, potassium, lithium and the like and in which R is hydrogen or phenyl radical.

The products so synthesized may be further treated as with 1–3 equivalents of formaldehyde to prepare the corresponding methylolated derivatives.

The invention will be illustrated in the following examples which are to be taken as illustrative only and are not to be construed as limitative. All parts are by weight unless otherwise stated.

EXAMPLE A

*Preparation of N-phenyl-α-chloroacetoguanamine intermediate*

354 parts of phenylbiguanide (2.0 moles) is dissolved in 500 milliliters of methanol to which 368 parts of ethylchloroacetate (3.0 moles) is added dropwise over a one-half hour period with stirring. The contents are heated for an additional two hours at 50° C.–69° C. Resultant mixture whose pH is 6.5 is stripped in vacuum and 200 milliliters is added to the concentrated resultant slush. The latter is filtered, washed with water and dried in vacuum. The resultant guanamine is insoluble in water, very soluble in methanol and is recovered in 61% yield.

In a similar manner, biguanide per se can be substituted for phenylbiguanide to prepare the corresponding haloacetoguanamine.

EXAMPLE 1

*Preparation of diethyl 4-amino-6-anilino-s-triazinylmethylphosphate*

A three-necked flask equipped with stirrer, thermometer and condenser is charged with 23.6 parts of N-phenyl-α-chloroacetoguanamine (0.1 mole) as prepared in Example A and 23 parts of triethyl phosphite. The mixture is heated to a temperature of from 160° C.–170° C. A liquid distillate is removed. When the latter ceased, the reaction is terminated. The residue in the reactor is cooled to room temperature and is then recovered as a hard, dark brown glassy-like diethylphosphonate compound.

EXAMPLE 2

All the glassy diethylphosphonate compound, prepared as in Example 1 above, is admixed with 5 parts of aqueous dilute hydrochloric acid and 15 parts of isopropanol, both parts by volume. The mixture is heated for ten hours at 95° C. During heating, aliquots are withdrawn from the reaction vessel to test for the hydrolysis of the diester. Utilizing potentiometric titration technique upon an aliquot, it is found that hydrolysis to the monoester occurs at the end of ten hours under the stated conditions, whereby 3.8 grams of the ethyl hydrogen 4-amino-6-anilino-s-triazinylmethylphosphonic acid is recovered by filtration as a yellow solid. This solid residue amounts to a yield of 12% based on the monoethyl ester.

The filtrate is next treated with 2 parts of concentrated hydrochloric acid by volume and 20 parts of ethanol. The strongly acid solution is heated for four hours at 89° C. A titration of an aliquot of the resultant reaction mixture indicated that 41% of the unreacted diester in the filtrate had been converted to the corresponding monoester. To the reaction mixture is added 4 parts of concentrated hydrochloric acid by volume and the solution is heated for a total of 18 hours. 6 parts of resultant yellow solid was recovered by filtration and added to the first recovered residue. A total yield of 9.8 parts of yellow solid crystals is obtained. This amounts to 32%, based on the monoethyl ester.

Resultant ethyl hydrogen 4-amino-6-anilino-s-triazinylmethylphosphonic acid is next reacted with sufficient alkali, such as sodium hydroxide, to obtain the corresponding salt of the phosphonic acid. The salt is difficultly water soluble and is readily soluble in a polar solvent such as ethanol or propyl alcohol.

EXAMPLE 3

The alkali metal salt of ethyl hydrogen 4,6-diamino-s-triazinylmethylphosphonic acid can be prepared in accordance with the procedure of Example 2 above but, as a reactant, chloroacetoguanamine rather than N-phenyl-α-chloroacetoguanamine, is employed.

To demonstrate the utility of the above class of compounds as antistatic agents, the following illustrative example is provided.

EXAMPLE 4

5 parts of the sodium salt of ethyl hydrogen 4-amino-6-anilino-s-triazinylmethylphosphonic acid, prepared as in the preceding example, is dissolved in 95 parts of isopropanol. A 9" x 9" sheet of nylon is next immersed in the solution, passed through squeeze rollers and then air dried. The dried sheet is folded over twice in the same direction so as to obtain a sheet measuring 2¼" x 9". A charge is induced on the sheet by stroking the same with a glass rod for 15 minutes. The sheet is now exposed to carbon particles that are placed on a table by holding the sheet above the particles. The closer in height that the sheet can be placed the more effective is the antistatic treating agent. In the present example, even at substantially zero height, there is no attraction of carbon particles to the nylon sheet, indicating clearly that the cloth is antistatic.

I claim:

1. As a new composition of matter:

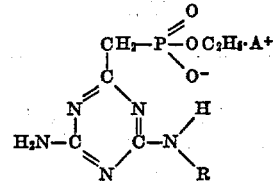

in which R is a radical selected from the group consisting of hydrogen and phenyl and A+ is an inorganic monovalent cation.

2. As a new composition of matter, the sodium salt of ethyl hydrogen 4-amino-6-anilino-s-triazinylmethylphosphonic acid.

No references cited.